United States Patent
Li et al.

(10) Patent No.: US 7,499,439 B2
(45) Date of Patent: Mar. 3, 2009

(54) METHOD FOR CONTROLLING TRANSMISSION RATES IN A WIRELESS COMMUNICATIONS SYSTEM

(75) Inventors: Shupeng Li, Edison, NJ (US); Sudhir Ramakrishna, New York, NY (US); Ashok N. Rudrapatna, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 402 days.

(21) Appl. No.: 11/145,559

(22) Filed: Jun. 3, 2005

(65) Prior Publication Data

US 2006/0274702 A1 Dec. 7, 2006

(51) Int. Cl.
*H04Q 7/24* (2006.01)
(52) U.S. Cl. ............... 370/338; 370/252; 370/328; 370/334; 370/335; 370/465; 455/45.2
(58) Field of Classification Search ............ 370/252, 370/328, 334, 335, 338, 465; 455/45.2
See application file for complete search history.

(56) References Cited

U.S. PATENT DOCUMENTS

| | | | | |
|---|---|---|---|---|
| 5,995,496 A * | 11/1999 | Honkasalo et al. | ...... | 370/318 |
| 7,142,521 B2 * | 11/2006 | Haugli et al. | ...... | 370/320 |
| 7,206,607 B2 * | 4/2007 | Kim et al. | ...... | 455/562.1 |
| 7,236,478 B2 * | 6/2007 | Wu et al. | ...... | 370/334 |
| 7,236,479 B2 * | 6/2007 | Kim | ...... | 370/334 |
| 2002/0131381 A1 * | 9/2002 | Kim et al. | ...... | 370/335 |
| 2003/0148738 A1 * | 8/2003 | Das et al. | ...... | 455/67.5 |
| 2003/0231606 A1 * | 12/2003 | Wu et al. | ...... | 370/334 |
| 2004/0151122 A1 * | 8/2004 | Lau et al. | ...... | 370/252 |
| 2004/0257975 A1 * | 12/2004 | Proctor, Jr. | ...... | 370/203 |
| 2005/0037718 A1 * | 2/2005 | Kim et al. | ...... | 455/101 |
| 2006/0009189 A1 * | 1/2006 | Kim et al. | ...... | 455/403 |

FOREIGN PATENT DOCUMENTS

| | | | |
|---|---|---|---|
| EP | EP 1 424 793 A1 | * | 6/2001 |
| WO | WO 99/23844 | * | 5/1999 |
| WO | WO 2005015775 A1 | * | 2/2005 |

OTHER PUBLICATIONS

International Search Report PCT/US2006/019307 dated Dec. 29, 2006.*

* cited by examiner

*Primary Examiner*—Nay Maung
*Assistant Examiner*—Janelle N. Young

(57) ABSTRACT

A method is provided for controlling communications between a base station and a mobile device. The method comprises transmitting a pilot signal having at least one transmitted characteristic over a channel. A data rate control signal is received, indicating a variation between the transmitted characteristic and a corresponding actual characteristic of the pilot signal received at a remote location. The data rate control signal is modified based on a coefficient related to the bandwidth of the channel, and a transmission rate is determined based on the modified data rate control signal.

7 Claims, 3 Drawing Sheets

METHOD FOR CONTROLLING TRANSMISSION RATES IN A WIRELESS COMMUNICATIONS SYSTEM

BACKGROUND OF THE INVENTION

1. Field of the Invention

This invention relates generally to telecommunications, and, more particularly, to wireless communications.

2. Description of the Related Art

In the field of wireless telecommunications, such as cellular telephony, a system typically includes a plurality of base stations distributed within an area to be serviced by the system. Various mobile devices within the area may then access the system and, thus, other interconnected telecommunications systems, via one or more of the base stations. Typically, a mobile device maintains communications with the system as it passes through an area by communicating with one and then another base station, as the mobile device moves. The mobile device may communicate with the closest base station, the base station with the strongest signal, the base station with a capacity sufficient to accept communications, etc.

In wireless communications systems, the base station typically schedules the time periods in which the mobile device is permitted to transmit information to the base station and the rate at which the mobile device transmits. Generally, the rate of transmission is selected based on measured characteristics of the forward link (FL) between the base station and the mobile device. For example, the base station typical transmits a pilot signal having "known" characteristics. The mobile device receives the pilot signal, compares the received pilot signal to the "known" characteristics and transmits a data rate control (DRC) report back to the base station. The base station uses the DRC report to select an appropriate transmission rate.

However, the transmission rates between the base station and the mobile device are increasing dramatically, such as in the case of multiple carrier systems. The format of the DRC report, however, is fixed and may not provide adequate feedback information to ensure that the transmission rates are maintained at their highest level. Moreover, the format of the DRC report cannot be readily modified without affecting the operation of legacy mobile devices.

SUMMARY OF THE INVENTION

The present invention is directed to overcoming, or at least reducing, the effects of one or more of the problems set forth above.

In one aspect of the instant invention, a method is provided for communicating between a base station and a mobile device. The method comprises receiving a control signal indicating at least one characteristic of a channel over which communications are delivered. The control signal is modified based on a coefficient related to a characteristic of the channel, and a transmission rate is determined for the channel based on the modified control signal.

In another aspect of the instant invention, a method is provided for communicating between a base station and a mobile device. The method comprises transmitting a pilot signal having at least one transmitted characteristic over a channel. A data rate control signal is received, indicating a variation between the transmitted characteristic and a corresponding actual characteristic of the pilot signal received at a remote location. The data rate control signal is modified based on a coefficient related to a characteristic of the channel, and a transmission rate is determined based on the modified data rate control signal.

BRIEF DESCRIPTION OF THE DRAWINGS

The invention may be understood by reference to the following description taken in conjunction with the accompanying drawings, in which like reference numerals identify like elements, and in which.

Figure 1:
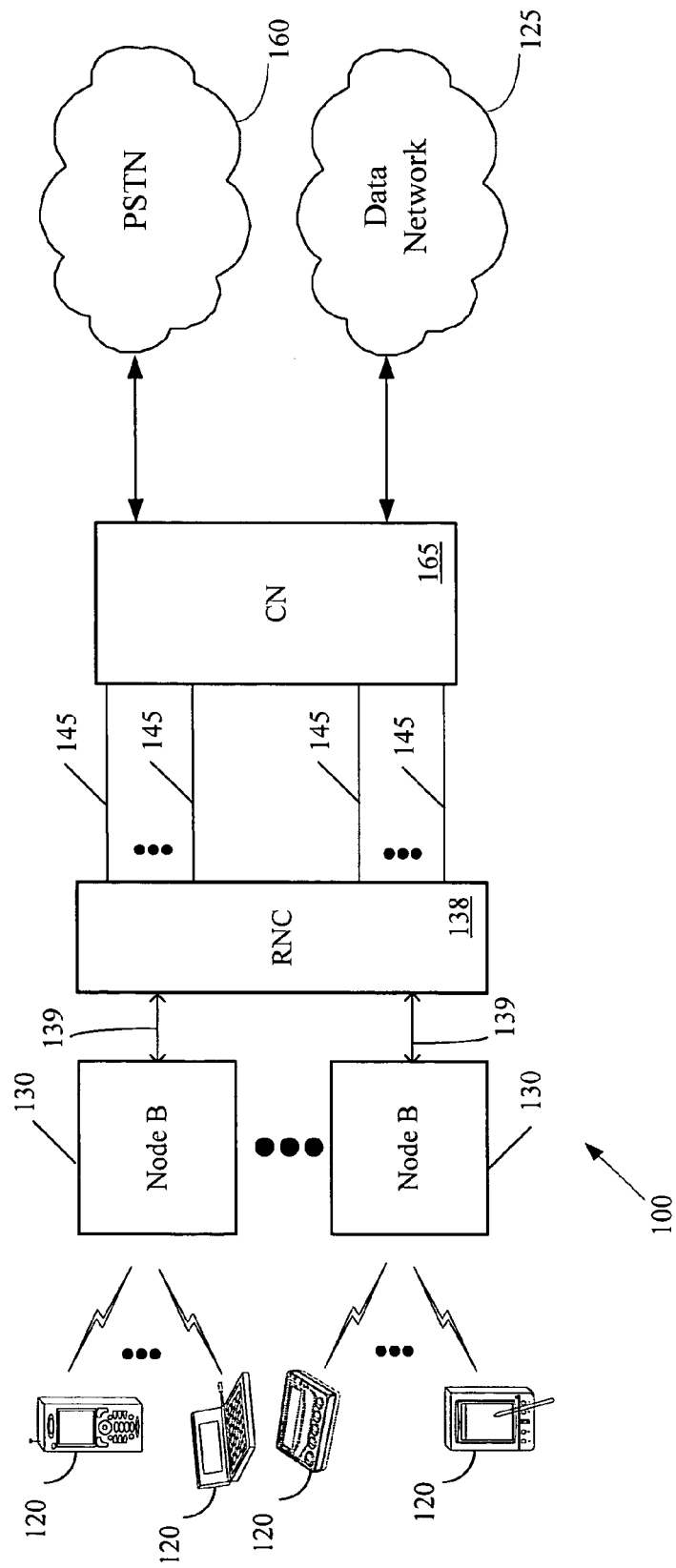
FIG. 1 is a block diagram of a communications system, in accordance with one embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

Turning now to the drawings, and specifically referring to FIG. 1, a communications system 100 is illustrated, in accordance with one embodiment of the present invention. For illustrative purposes, the communications system 100 of FIG. 1 is a Code Division Multiple Access (CDMA), although it should be understood that the present invention might be applicable to other systems that support data and/or voice communications, such as a Universal Mobile Telephone System (UMTS). The communications system 100 allows one or more mobile devices 120 to communicate with a data network 125, such as the Internet, and/or a Publicly Switched Telephone Network (PSTN) 160 through one or more base stations 130. The mobile device 120 may take the form of any of a variety of devices, including cellular phones, personal digital assistants (PDAs), laptop computers, digital pagers, wireless cards, and any other device capable of accessing the data network 125 and/or the PSTN 160 through the base station 130.

In one embodiment, a plurality of the base stations 130 may be coupled to a Radio Network Controller (RNC) 138 by one or more connections 139, such as T1/EI lines or circuits, ATM circuits, cables, optical digital subscriber lines (DSLs), and the like. Although one RNC 138 is illustrated, those skilled in the art will appreciate that a plurality of RNCs 138 may be utilized to interface with a large number of base stations 130. Generally, the RNC 138 operates to control and coordinate the base stations 130 to which it is connected. The RNC 138 of FIG. 1 generally provides replication, communications, runtime, and system management services. The RNC 138, in the illustrated embodiment handles calling processing functions, such as setting and terminating a call path and is capable of determining a data transmission rate on the forward and/or reverse link for each mobile device 120 and for each sector supported by each of the base stations 130.

The RNC 138 is also coupled to a Core Network (CN) 165 via a connection 145, which may take on any of a variety of forms, such as T1/EI lines or circuits, ATM circuits, cables, optical digital subscriber lines (DSLs), and the like. Generally the CN 165 operates as an interface to a data network 125 and/or to the PSTN 160. The CN 165 performs a variety of functions and operations, such as mobile device authentication, however, a detailed description of the structure and operation of the CN 165 is not necessary to an understanding and appreciation of the instant invention. Accordingly, to avoid unnecessarily obfuscating the instant invention, further details of the CN 165 are not presented herein.

The data network 125 may be a packet-switched data network, such as a data network according to the Internet Protocol (IP). One version of IP is described in Request for Comments (RFC) 791, entitled "Internet Protocol," dated September 1981. Other versions of IP, such as IPv6, or other connectionless, packet-switched standards may also be utilized in further embodiments. A version of IPv6 is described in RFC 2460, entitled "Internet Protocol, Version 6 (IPv6) Specification," dated December 1998. The data network 125 may also include other types of packet-based data networks in further embodiments. Examples of such other packet-based data networks include Asynchronous Transfer Mode (ATM), Frame Relay networks, and the like.

As utilized herein, a "data network" may refer to one or more communication networks, channels, links, or paths, and systems or devices (such as routers) used to route data over such networks, channels, links, or paths.

Thus, those skilled in the art will appreciate that the communications system 100 facilitates communications between the mobile devices 120 and the data network 125 and/or the PSTN 160. It should be understood, however, that the configuration of the communications system 100 of FIG. 1 is exemplary in nature, and that fewer or additional components may be employed in other embodiments of the communications system 100 without departing from the spirit and scope of the instant invention.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Figure 2:
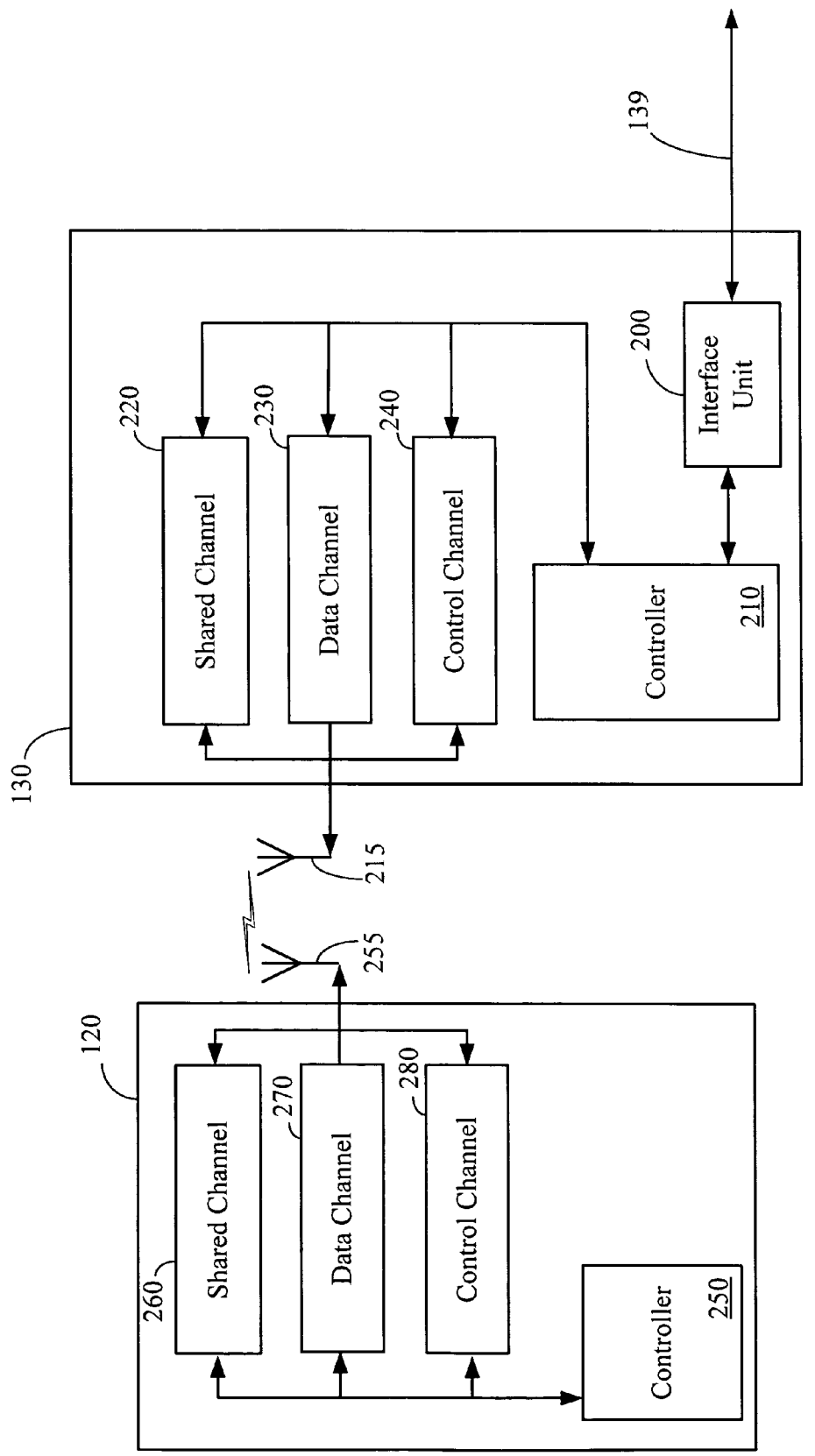
FIG. 2 depicts a block diagram of one embodiment of a base station and a mobile device in the communications system of FIG. 1.

Referring now to FIG. 2, a block diagram of one embodiment of a functional structure associated with an exemplary base station 130 and mobile device 120 is shown. The base station 130 includes an interface unit 200, a controller 210, an antenna 215 and a plurality of channels, such as a shared channel 220, a data channel 230, a control channel 240, and the like. The interface unit 200, in the illustrated embodiment, controls the flow of information between the base station 130 and the RNC 138 (see FIG. 1). The controller 210 generally operates to control both the transmission and reception of data and control signals over the antenna 215 and the plurality of channels 220, 230, 240 and to communicate at least portions of the received information to the RNC 138 via the interface unit 200.

The mobile device 120 shares certain functional attributes with the base station 130. For example, the mobile device 120 includes a controller 250, an antenna 255 and a plurality of channels, such as a shared channel 260, a data channel 270, a control channel 280, and the like. The controller 250 generally operates to control both the transmission and reception of data and control signals over the antenna 255 and the plurality of channels 260, 270, 280.

Normally, the channels 260, 270, 280 in the mobile device 120 communicate with the corresponding channels 220, 230, 240 in the base station 130. Under the operation of the controllers 210, 250, the channels 220, 260; 230, 270; 240, 280 are used to effect a controlled scheduling for communications from the mobile device 120 to the base station 130.

In one embodiment of the instant invention, one or more of the channels 260, 270, 280 in the mobile device 120 and the corresponding channels 220, 230, 240 in the base station 130 may employ a flexible bandwidth. Further, each channel may be comprised of a plurality of sub-channels, each sub-channel having its own carrier frequency and being capable of substantially simultaneously carrying information thereon. In some embodiments of the instant invention, it may be useful to design the system to operate with legacy mobile devices that are not configured to transmit and/or receive information on a plurality of sub-channels or bands.

In one embodiment of the instant invention, the FL time slots may have the same duration and the same alignment with respect to a global time reference as the time slots in the FL of the above-referenced legacy system. The new FL, however, may occupy a variable bandwidth. In one aspect of the instant invention, transmissions of mobile device data on the FL in the new time slots to the mobile devices 120 may occupy a variable bandwidth, which may consist of a plurality of sub-bands, where each sub-band is centered on a separate carrier frequency. To maintain operability with respect to legacy mobile devices 120, control information directed to the legacy mobile devices 120 may be transmitted in each new time slot (where one or more control channel is targeted for each mobile device 120), and over the same time portion of the new time slots as the Control Portion (CP) in the legacy time slots.

In another aspect of the instant invention, the FL frequency bandwidth may be comprised of an integral number of sub-bands, with each sub-band having a bandwidth equaling the fixed bandwidth of the legacy FL. On each sub-band, the FL is time slotted, with the duration and alignment with respect to a global time reference of the new time slots being the same as those of the legacy time slots. The FL transmissions on all the sub-bands are time aligned in that the respective time slots are transmitted simultaneously. In this aspect, transmissions of the control information to the legacy mobile devices may be restricted to a subset of the FL sub-bands. On the sub-bands on which such control information is transmitted, it is transmitted in every slot, and in the same position in the time slot as in the time slots of the legacy FL. In this aspect, the time slots on one or more (and in some applications, all) of the sub-bands may be used simultaneously to transmit to the new mobile devices 120.

In some applications of the instant invention, it may be useful to have the sub-bands of the FL contiguous over the FL frequency bandwidths. In other applications, the sub-bands may be non-contiguous.

With respect to transmissions of mobile device data, the FL time slots in the new system may be segregated, with a first portion of the time slots being reserved for mobile device data transmissions to legacy mobile devices 120, and a second portion of the time slots available for data transmissions to the new mobile devices 120. For example, in the data portion of the time slots reserved for the legacy mobile devices 120, data for legacy mobile devices 120 is transmitted. Similarly, in the data portion of the time slots available for the new mobile devices 120, data for the new mobile devices is transmitted. Those skilled in the art will appreciate that the allocation of time slots to legacy and new mobile devices 120 may vary over time.

In one embodiment of the instant invention, transmissions to the new mobile devices 120 in the new FL time slots (over at least the data portion of the time slot) may be accomplished by the base station 130 using any of a variety of known air interface techniques. For example, CDMA, orthogonal frequency division multiplexing (OFDM), time division multiple access (TDMA), and the like may be employed. The segregation of the FL time slots of the new system with respect to mobile device data transmissions ensures that the actual air interface technology used to transmit to the new mobile devices 120 has no significant effect on the FL transmissions to the legacy mobile devices 120. Moreover, it should be appreciated that the base station 130 may use different air interface transmission techniques for transmissions to the new mobile devices 120 on each of the different sub-bands.

To enhance transmissions to the new mobile devices 120 on the new FL time slots, the base station 130 may employ a variable number of transmit antennas or beams. Likewise, the mobile devices 120 may also employ multiple receiving antennas or beams. The use of the term transmit beam herein is intended to imply a signal formed by a composition of signals originating from a plurality of antennas, but which may be detected as a single transmit signal by an intended receiver. In the context of the instant invention, an array of antennas can transmit an array of beams, and transmit antenna is used synonymously with transmit beam. Those skilled in the art will appreciate that the new mobile devices 120 may employ a variable number of receive antennas to receive a transmit beam.

In one embodiment of the instant invention, it may be useful to take advantage of the presence of the plurality of transmit antennas on the base station 130 by transmitting a plurality of secondary pilot channels from each of the transmit antennas/beams as an enabler for the mobile device 120 to make measurements and report back information to the base station 130 on the signal quality of the various transmit antennas/beams. These metrics could be either a set or a single scalar quantity. Further, it may be desirable to only transmit these secondary pilot channels from the new time slots in a time period outside of the CP of the new time slot.

To utilize the presence of the plurality of transmit antennas, in transmissions of data to the new mobile devices 120, the base station 130 may employ a multi-antenna transmission scheme designed to lead to superior performance and increased spectral efficiency and peak rates. The new mobile devices 120 may use multiple receive antennas to receive and process such transmitted information. For example, multi-antenna schemes such as selection transmit diversity (transmitting to mobile devices 120 from only one or a subset of antennas or beams), transmit diversity (transmitting a space-time coded signal from multiple transmit antennas), closed-loop transmit diversity (beam-forming signal from multiple antennas to achieve increased gain at the receiver with or without the assistance of feedback from the mobile devices 120), MIMO-Code reuse (transmitting multiple data streams simultaneously to the mobile devices 120 to increase data rates), and fixed beam with beam switching may be employed.

As discussed above, the methodology used to control the rate at which information may be transmitted on the forward link (FL) in prior art systems depends on a feedback mechanism that does not account for the higher rates that may be achieved by the broader bandwidth systems discussed herein. Accordingly, in at least one embodiment of the instant invention, an expanded feedback mechanism is used to allow FL transmissions to occur at a rate more closely related to the true capacity of the FL.

In one embodiment of the instant invention, the operation of the mobile device 120 remains unchanged, with respect to generating the DRC report. Rather, the base station 130 expands the values contained in the DRC report by multiplying the DRC value by an offset. If the bandwidth of the earlier FL is $B\_earlier$, and that of the new, broader bandwidth FL is $B\_new$, the offset or bandwidth scale factor S may be defined as:

$$S = B\_new / B\_earlier.$$

Those skilled in the art will appreciate that in one embodiment of the instant invention the DRC values are in linear (non-logarithmic) units.

In one embodiment of the instant invention, the offset or scale factor S may be the same for all mobile devices 120 and for all values of the DRC report. Alternatively, the offset may be a function of the DRC report value received, applied the same way to DRC report values received from any mobile. Specifically, if $N\_DRC$ possible values exist for the DRC report, $N\_DRC$ possible values for the offset will also exist, one for each of the $N\_DRC$ values of the DRC report.

Alternatively, the offset may be specific to each mobile device 120. An exemplary method of calculating the offset for a particular mobile device 120 may be as follows. The base station 130 computes the average of the DRC values reported by the particular mobile device 120. This average may be updated with each additional DRC value reported. The calculated average value up to a particular time is $Average\_DRC$. Then, the base station 130 sets the DRC offset for that mobile device 120 to be:

$$\text{offset} = S \times Average\_DRC$$

Those skilled in the art will appreciate that above-described method, in addition to being mobile specific, is also time variant.

In an alternative embodiment, a combination of the methods discussed above may be used to make the offset specific to both the mobile device 120 and the DRC report value. Alternatively, the value of the offset to be used may be indicated to the base station 130 by the mobile device 120.

Those skilled in the art will appreciate that the mobile devices 120 are capable of generating Ack/Nack reports, indicating whether a particular packet of data was successfully received by the mobile device 120. That is, when the mobile device 120 successfully receives a packet of data, it delivers an acknowledgment (ACK) signal to the base station 130. Alternatively, when the packet is not properly received, the mobile device 120 delivers a negative acknowledgment (NACK) signal to the base station 130. Those skilled in the art will appreciate that the system may be configured so that either the ACK or NACK signals are implicit. For example, the base station 130 may be configured such that when no ACK signal is received, then the base station 130 assumes that the data packet was successfully received by the mobile device 120. In this example, NACK signals will then be explicit. Those skilled in the art will appreciate that the base station 130 may be configured oppositely, with NACK signals being implicit and ACK signals being explicit.

Figure 3:
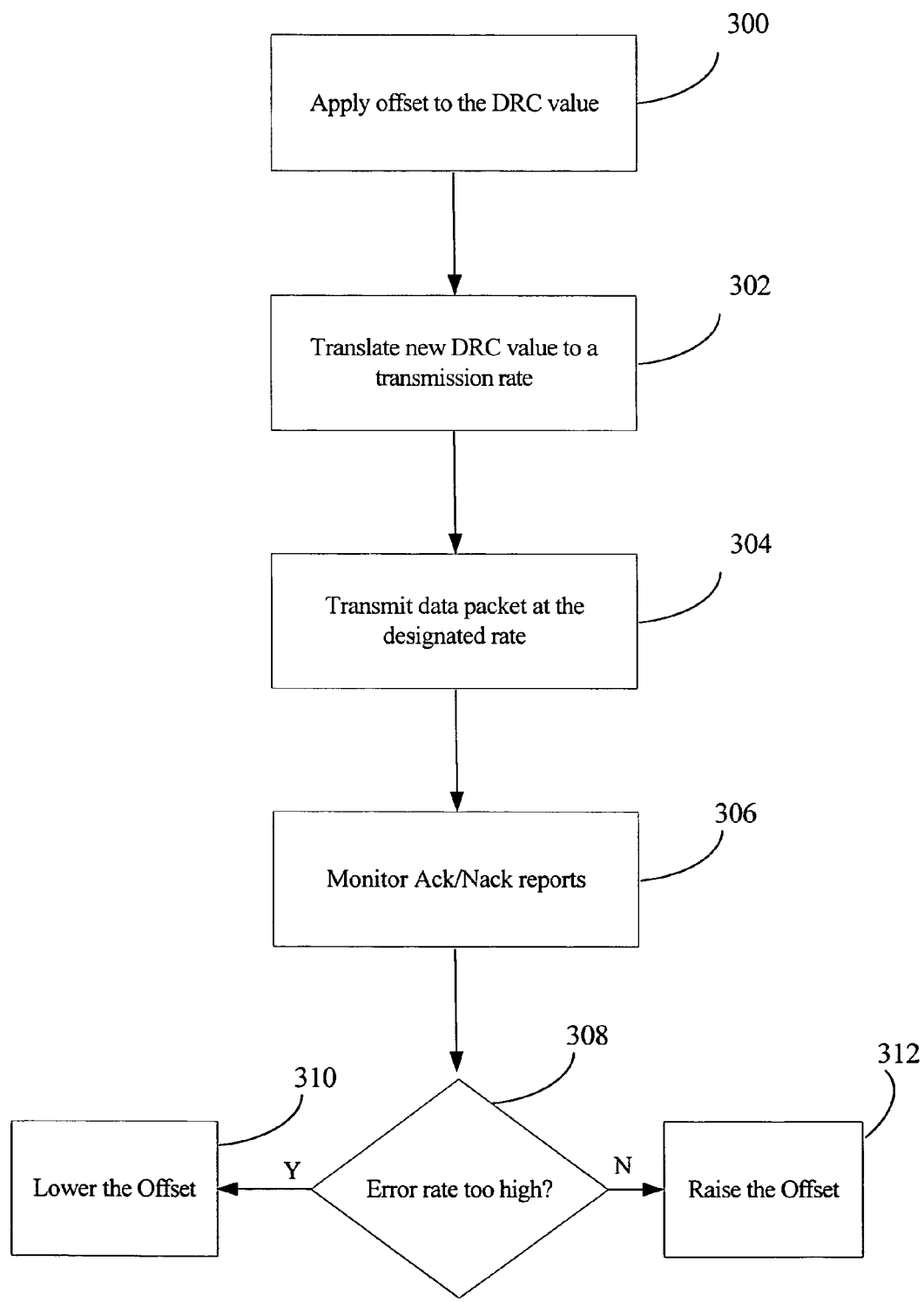
FIG. 3 depicts a flow chart of one embodiment of a method that may be used to control transmission rates on the forward links of the communications systems of FIGS. 1 and 2.

The base station 130 may use the Ack/Nack reports from the mobile device 120 to update the offsets being used for that mobile device 120. Turning now to FIG. 3, a flow chart of a method that may be employed by the base station 130 to tune the offset is shown. The process begins at block 300 with the base station applying the offset (generated using any of the methods discussed above) to the reported DRC value. At block 302, the base station 130 translates the new DRC value to a transmission rate, using, for example, a look-up table. Thereafter, at block 304, the base station 130 transmits data packets to that mobile device 120 at that rate. At block 306, the base station 130 monitors and keeps track of the resultant error rate at the mobile device 120 via the Ack/Nack reports from that mobile device 120. At decision block 308, if the error rates are higher than adequate/acceptable, the base station 130 lowers the offset at block 310 (which will lead to more conservative transmission rate decisions w.r.t that mobile device 120). On the other hand, if the errors are lower than adequate/acceptable, the base station 130 increases the offset at block 312 (which will lead to more aggressive transmission rate decisions w.r.t that mobile device 120). It may be noted that this adjustment of the offset allows per-mobile device 120, per-DRC report value adjustment, which also adapts with time varying channel conditions. This general method of tuning the offset is applicable to all the methods of setting the offset discussed above.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system's memories or registers or other such information storage, transmission or display devices.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices. The storage devices referred to in this discussion may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions when executed by the control units cause the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. Consequently, the method, system and portions thereof and of the described method and system may be implemented in different locations, such as the wireless unit, the base station, a base station controller and/or mobile switching center. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. It is therefore evident that the particular embodiments disclosed above may be altered or modified and all such variations are considered within the scope and spirit of the invention. Accordingly, the protection sought herein is as set forth in the claims below.

We claim:

1. A method for communicating between at least one base station and at least one mobile device, comprising:
    transmitting, from the base station, a pilot signal having at least one transmitted characteristic over a forward link channel;
    receiving, at the base station, a data rate control signal transmitted by the mobile device, the data rate control signal indicating a data rate in a first range of data transmission rates, the data rate control signal being based on a characteristic of the forward link channel within a second preselected bandwidth;
    scaling, at the base station, the received data rate control signal by a scale factor so that the scaled received data control signal indicates a data rate in a second range of data transmission rates, wherein scaling the received data rate control signal comprises expanding the data rates indicated in the scaled received data rate control signal based on a coefficient related to a ratio of a first preselected bandwidth and the second preselected bandwidth; and
    determining a transmission rate in the second range of data transmission rates based on the scaled data rate control signal.

2. A method, as set forth in claim 1, further comprising modifying the scale factor based on signals being successfully transmitted over the forward link channel.

3. A method, as set forth in claim 2, wherein modifying the scale factor based on signals being successfully transmitted over the forward link channel further comprises modifying the scale factor based on receiving an indication that signals were successfully received at a remote location over the forward link channel.

4. A method, as set forth in claim 3, wherein modifying the scale factor based on receiving the indication that signals were successfully received at the remote location over the forward link channel further comprises increasing the scale factor based on receiving the indication that signals were successfully received at the remote location.

5. A method, as set forth in claim 1, further comprising modifying the scale factor based on signals being unsuccessfully transmitted over the forward link channel.

6. A method, as set forth in claim 5, wherein modifying the scale factor based on signals being unsuccessfully transmitted over the forward link channel further comprises modifying the scale factor based on receiving an indication that signals were unsuccessfully received at a remote location over the forward link channel.

7. A method, as set forth in claim 6, wherein modifying the scale factor based on receiving the indication that signals were unsuccessfully received at the remote location over the forward link channel further comprises decreasing the scale factor based on receiving the indication that signals were unsuccessfully received at the remote location.

* * * * *